(12) United States Patent
Propheter-Hinckley et al.

(10) Patent No.: US 11,293,347 B2
(45) Date of Patent: Apr. 5, 2022

(54) AIRFOIL WITH BAFFLE SHOWERHEAD AND COOLING PASSAGE NETWORK HAVING AFT INLET

(71) Applicant: United Technologies Corporation, Farmington, CT (US)

(72) Inventors: Tracy A. Propheter-Hinckley, Rocky Hill, CT (US); Allan N. Arisi, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 587 days.

(21) Appl. No.: 16/667,941

(22) Filed: Oct. 30, 2019

(65) Prior Publication Data

US 2020/0332713 A1   Oct. 22, 2020

Related U.S. Application Data

(60) Provisional application No. 62/757,920, filed on Nov. 9, 2018.

(51) Int. Cl.
| | |
|---|---|
| *F02C 7/12* | (2006.01) |
| *F01D 9/02* | (2006.01) |
| *F01D 9/06* | (2006.01) |
| *F01D 5/18* | (2006.01) |

(52) U.S. Cl.
CPC .............. *F02C 7/125* (2013.01); *F01D 5/189* (2013.01); *F01D 9/02* (2013.01); *F01D 9/065* (2013.01)

(58) Field of Classification Search
CPC .......... F01D 5/186; F01D 5/188; F01D 5/189; F01D 9/02; F01D 9/065; F05D 2240/121; F05D 2260/201; F05D 2260/204; Y02T 50/60
See application file for complete search history.

(56) References Cited

U.S. PATENT DOCUMENTS

| | | | | |
|---|---|---|---|---|
| 3,891,348 A * | 6/1975 | Auxier | ................... | F01D 5/189 |
| | | | | 416/97 R |
| 4,946,346 A * | 8/1990 | Ito | ........................... | F01D 5/189 |
| | | | | 415/115 |
| 5,392,515 A * | 2/1995 | Auxier | ................... | B23P 15/04 |
| | | | | 29/889.721 |
| 6,000,908 A * | 12/1999 | Bunker | .................. | F01D 5/189 |
| | | | | 416/95 |
| 6,283,708 B1 * | 9/2001 | Zelesky | ................. | F01D 5/189 |
| | | | | 416/97 R |

(Continued)

*Primary Examiner* — Igor Kershteyn
(74) *Attorney, Agent, or Firm* — Carlson, Gaskey & Olds, P.C.

(57) ABSTRACT

An airfoil has a leading end, a trailing end, and first and second sides that join the leading end and the trailing end. A rib extends from the first side to the second side and partitions an internal core cavity into a forward cavity and an aft cavity. A baffle is disposed in the forward cavity and has a showerhead array of impingement orifices adjacent the leading end of the airfoil wall. A cooling passage network is embedded in the airfoil wall between inner and outer portions of the airfoil wall. The cooling passage network has an inlet orifice through the inner portion of the airfoil wall, an array of pedestals, and at least one outlet orifice through the outer portion. The inlet orifice opens to the forward cavity at a location aft of the showerhead array of impingement orifices.

20 Claims, 4 Drawing Sheets

(56) References Cited

U.S. PATENT DOCUMENTS

| | | | |
|---|---|---|---|
| 6,769,866 B1* | 8/2004 | Kannefass | F01D 5/147 |
| | | | 415/115 |
| 7,600,966 B2 | 10/2009 | Devore et al. | |
| 8,777,569 B1 | 7/2014 | Liang | |
| 9,850,763 B2* | 12/2017 | Itzel | F01D 9/041 |
| 9,896,954 B2* | 2/2018 | Walston | B32B 5/26 |
| 10,012,106 B2* | 7/2018 | Spangler | F01D 5/189 |
| 10,260,363 B2* | 4/2019 | Snider | B22F 5/04 |
| 2019/0316472 A1* | 10/2019 | Xu | F01D 9/041 |

\* cited by examiner

AIRFOIL WITH BAFFLE SHOWERHEAD AND COOLING PASSAGE NETWORK HAVING AFT INLET

CROSS-REFERENCE TO RELATED APPLICATION

This application claims priority to U.S. Provisional Application No. 62/757,920 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall that defines a leading end, a trailing end, and first and second sides joining the leading end and the trailing end. The first and second sides span in a longitudinal direction between first and second ends. The airfoil wall circumscribes an internal core cavity. A rib extends from the first side to the second side and partitions the internal core cavity into a forward cavity and an aft cavity. A baffle is disposed in the forward cavity. The baffle has a showerhead array of impingement orifices adjacent the leading end of the airfoil wall. A cooling passage network is embedded in the airfoil wall between inner and outer portions of the airfoil wall. The cooling passage network has an inlet orifice through the inner portion of the airfoil wall, an array of pedestals, and at least one outlet orifice through the outer portion. The inlet orifice opens to the forward cavity at a location aft of the showerhead array of impingement orifices.

In a further embodiment of any of the foregoing embodiments, the outlet orifice is aft of the rib.

In a further embodiment of any of the foregoing embodiments, the first side is a suction side and the second side is a pressure side, and the cooling passage network is in the second side.

In a further embodiment of any of the foregoing embodiments, the airfoil wall includes a cooling hole through the first side and opening to the forward cavity aft of the showerhead array of impingement orifices.

In a further embodiment of any of the foregoing embodiments, the first side includes trip strips in the forward cavity.

In a further embodiment of any of the foregoing embodiments, the second side excludes any trip strips.

In a further embodiment of any of the foregoing embodiments, the first side includes stand-off ridges in the forward cavity and the baffle abuts the stand-off ridges.

In a further embodiment of any of the foregoing embodiments, the stand-off ridges are elongated in a chord-wise direction of the airfoil section and are spaced apart in the longitudinal direction of the airfoil section.

In a further embodiment of any of the foregoing embodiments, the baffle is in a fixed position in the forward cavity with a channel between the baffle and the airfoil wall. The channel diverges along the first side in the forward cavity.

In a further embodiment of any of the foregoing embodiments, an aft 60% of the baffle excludes any impingement orifices.

In a further embodiment of any of the foregoing embodiments, the first side is a suction side and the second side is a pressure side. The cooling passage network is in the second side. The airfoil wall includes a cooling hole through the first side and opening to the forward cavity aft of the showerhead array of impingement orifices, and the first side includes trip strips in the forward cavity.

In a further embodiment of any of the foregoing embodiments, the second side excludes any trip strips, the first side includes stand-off ridges in the forward cavity, and the baffle abuts the stand-off ridges.

In a further embodiment of any of the foregoing embodiments, the stand-off ridges are elongated in a chord-wise direction of the airfoil section and are spaced apart in the longitudinal direction of the airfoil section, and an aft 60% of the baffle excludes any impingement orifices.

A gas turbine engine according to an example of the present disclosure includes a compressor section, a combustor in fluid communication with the compressor section, and a turbine section in fluid communication with the combustor. The turbine section has a turbine airfoil that includes an airfoil section that has an airfoil wall that defines a leading end, a trailing end, and first and second sides joining the leading end and the trailing end. The first and second sides span in a longitudinal direction between first and second ends. The airfoil wall circumscribes an internal core cavity, a rib extending from the first side to the second side and partitioning the internal core cavity into a forward cavity and an aft cavity, and a baffle disposed in the forward cavity. The baffle has a showerhead array of impingement orifices adjacent the leading end of the airfoil wall, and a cooling passage network embedded in the airfoil wall between inner and outer portions of the airfoil wall. The cooling passage network has an inlet orifice through the inner portion of the airfoil wall, an array of pedestals, and at least one outlet orifice through the outer portion. The inlet orifice opens to the forward cavity at a location aft of the showerhead array of impingement orifices.

In a further embodiment of any of the foregoing embodiments, the outlet orifice is aft of the rib.

In a further embodiment of any of the foregoing embodiments, the first side is a suction side and the second side is a pressure side, and the cooling passage network is in the second side.

In a further embodiment of any of the foregoing embodiments, the airfoil wall includes a cooling hole through the first side and opening to the forward cavity aft of the showerhead array of impingement orifices.

In a further embodiment of any of the foregoing embodiments, the first side is a suction side and the second side is a pressure side. The cooling passage network is in the second side. The airfoil wall includes a cooling hole through the first side and opening to the forward cavity aft of the showerhead array of impingement orifices, and the first side includes trip strips in the forward cavity.

In a further embodiment of any of the foregoing embodiments, the second side excludes any trip strips, the first side includes stand-off ridges in the forward cavity, and the baffle abuts the stand-off ridges.

In a further embodiment of any of the foregoing embodiments, the stand-off ridges are elongated in a chord-wise direction of the airfoil section and are spaced apart in the longitudinal direction of the airfoil section, and an aft 60% of the baffle excludes any impingement orifices.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
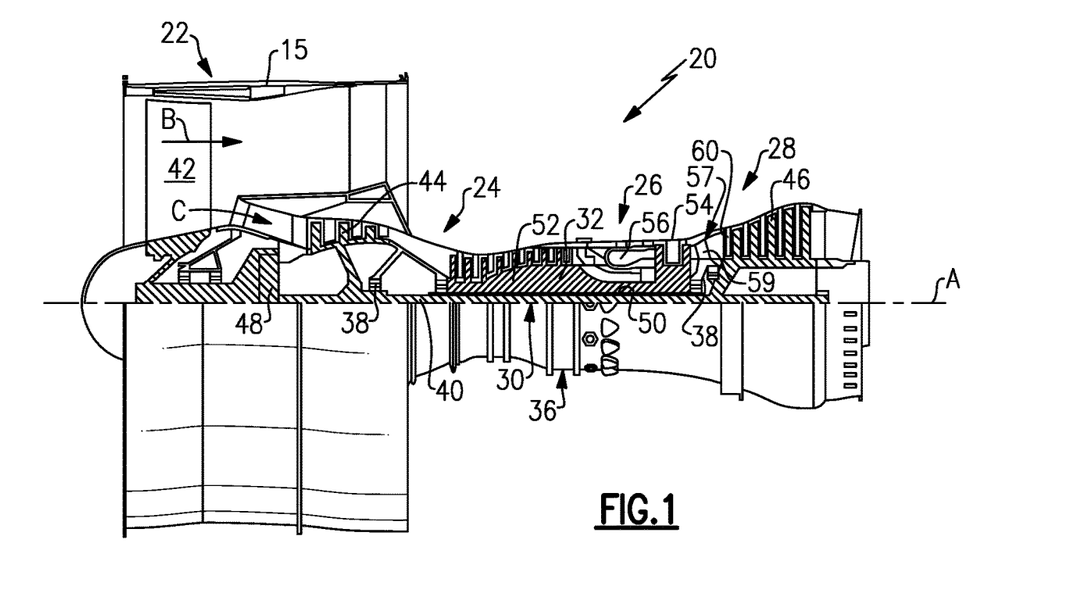
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

Figure 2A:
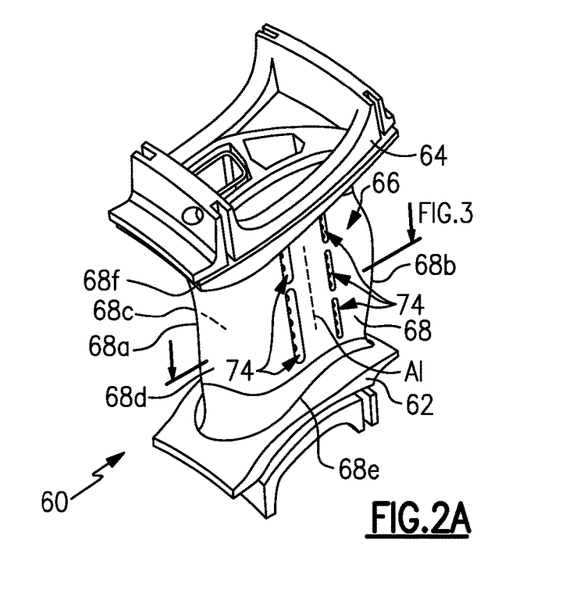
FIG. 2A illustrates an airfoil of the engine of FIG. 1.
Figure 2B:
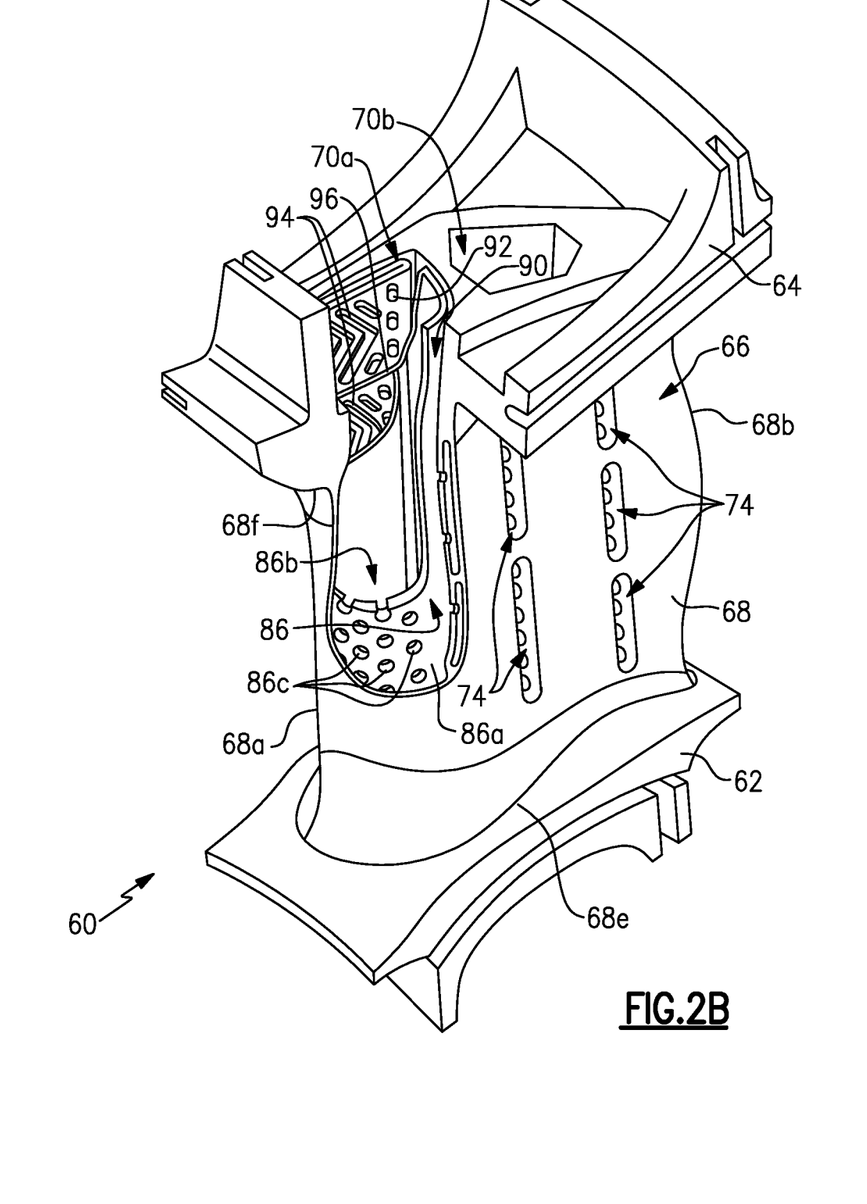
FIG. 2B illustrates a partial cutaway view of the airfoil of FIG. 2A

FIG. 2A illustrates a representative example of a turbine airfoil 60 used in the turbine engine 20 (see also FIG. 1), and FIG. 2B illustrates a partial cutaway view of the airfoil 60. As shown, the turbine airfoil 60 is a turbine vane; however, it is to be understood that, although the examples herein may be described with reference to the turbine vane, this disclosure is also applicable to turbine blades. The turbine airfoil 60 is also shown in a cross-sectional view in FIG. 3.

Figure 3:
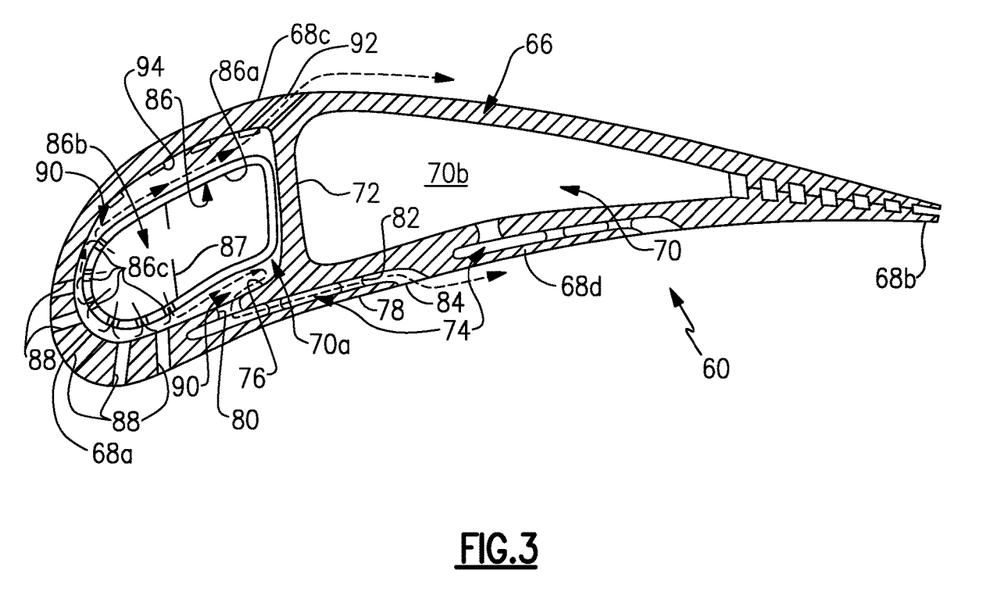
FIG. 3 illustrates a sectioned view of the airfoil of FIG. 2A.

Referring to FIGS. 2A, 2B, and 3, the turbine airfoil 60 includes an inner or first platform 62, an outer or second platform 64, and an airfoil section 66 that spans in a longitudinal direction A1 (which is also a radial direction relative to the engine central axis A) between the first and second platforms 62/64. Terms such as "radially," "axially," or variations thereof are used herein to designate directionality with respect to the engine central axis A.

The airfoil section 66 includes an airfoil outer wall 68 that delimits the profile of the airfoil section 66. The outer wall 68 defines a leading end 68a, a trailing end 68b, and first and second sides 68c/68d that join the leading and trailing ends 68a/68b. The first and second sides 68c/68d span in the longitudinal direction between first and second ends 68e/68f. The first and second ends 68e/68f are attached, respectively, to the first and second platforms 62/64. In this example, the first side 68c is a suction side and the second side 68d is a pressure side. As shown in a sectioned view through the airfoil section 66 in FIG. 3, the outer wall 68 circumscribes an internal core cavity 70. In this example, the airfoil section 66 includes a rib 72 that extends from the first side 68c to the second side 68d and partitions the cavity 70 into a forward core cavity 70a and an aft core cavity 70b.

The airfoil 60 includes a baffle 86 inside the forward core cavity 70a. This baffle 86 circumscribes the forward core cavity 70a and is offset a determined distance from the outer wall 68. As a result, there is a low aspect ratio channel 90 formed between the outer wall 68 and the baffle 86.

The shape of the baffle 86 generally follows the shape of the forward core cavity 70a but is smaller than the cavity 70a so as to enable assembly/disassembly of the baffle 86 into/from the cavity 70a. The baffle 86 is in a fixed position in the cavity 70a. For instance, the baffle 86 can be welded or otherwise affixed with the first platform 62, the second platform 64, or both. In the fixed position, which is shown in FIGS. 2B and 3, the channel 90 surrounds the baffle 86. The channel 90 provides a stand-off distance between the baffle 86 and airfoil wall 68, and between the baffle 86 and the rib 72. The baffle 86 is also open at one and/or both radial ends at the root and/or outer radius of the airfoil 60 in order to receive cooling air.

In typical baffle designs, there are multiple radial arrays of holes all around the perimeter of the baffle inserted within the leading edge core compartment of an airfoil. The baffle holes, also referred to as impingement holes, deliver jets of cold air across the low aspect ratio cavity created between the airfoil core internal wall and the offset baffle. These cold air jets impinge on the inside surface of the airfoil wall, thereby augmenting surface convection and cooling of the airfoil. The baffle holes in proximity with the pressure side, leading edge and suction sides of the airfoil walls are commonly referred to as pressure side, leading edge and suction side baffle impingement holes, respectively. While most baffle impingement holes are usually round, different impingement shapes, sizes and arrangement may be used depending on the desired internal convection and pressure losses across the baffle impingement holes.

The spent impingement air is then bled off via cooling holes 92 on the airfoil wall 68 to provide surface film-cooling on the airfoil external surface. Alternatively, the spent impingement air may also be bled to the airfoil surface via least one cooling passage network 74 embedded in the airfoil outer wall 68 between inner and outer portions 76/78 of the airfoil wall 68. The cooling passage networks 74 may also be referred to as minicores or minicore passages. A "minicore" or "minicore passage" is a reference to the small investment casting core that is typically used to make such an embedded passage, as opposed to a main core that is used to form a main or central core cavity in an airfoil. In this example, one or more of the cooling passage networks 74 is embedded in the second side 68d of the outer wall 68, although one or more networks 74 could additionally or alternatively be embedded in the first side 68c.

The design of the baffle impingent holes takes into account the pressure drop across the baffle holes such that the spent air retains sufficient pressure margin relative to the local external airfoil pressure to allow the air to flow across the airfoil wall to the airfoil surface via the respective local conduit, either cooling holes and/or cast cooling passage such as minicores. As a result, typical baffle hole geometry, hole size and arrangement may vary between the pressure side, leading edge and suction side impingement holes.

In contrast, FIG. 3 shows the baffle 86 for the forward core cavity 70. The baffle 86 includes a baffle wall 86a that is generally longitudinally-elongated and circumscribes a hollow interior 86b. One end of the baffle 86 may be open to receive cooling air. The baffle wall 86a includes a showerhead array of impingement orifices 86c adjacent the leading end 68a of the airfoil wall 68. The showerhead array of impingement orifices 86c is longitudinally coextensive or substantially longitudinally coextensive with the longitudinal span of the leading end 68a of the airfoil wall 68. The baffle 86 only includes impingement orifices 86c adjacent the leading edge 68a, while the remainder of the baffle 86 does not have any impingement orifices. In this design, the baffle 86 is used to provide impingement convective cooling at the leading edge 68a. The spent showerhead impingement air flows through the low aspect ratio channel 90 created between the baffle and the airfoil internal wall to the pressure side and suction holes 74 and 92 respectively. Some of the impingement spent air is also bled through the showerhead cooling holes 88.

It can be appreciated that the cooling holes that break out close to the leading edge i.e. showerhead cooling holes 88, are subject to a high static pressures at the airfoil external surface compared to cooling holes and passages that break out on the suction side and pressure side. As such, the baffle impingement orifices 86c close to the leading edge 68a enable for controlled pressure loss through the baffle 86 therefore creating sufficient pressure margin for air to flow across the showerhead cooling holes 88. The showerhead array of impingement orifices 86c may be directed primarily over a limited region that encompasses a stagnation point on the leading end 68a. In this example, the limited region is a region of the leading end 68a that includes showerhead cooling holes 88. As a further example, the aft 60% of the baffle 86, demarcated at line 87 (FIG. 3), may exclude any impingement orifices.

In contrast to conventional baffles which utilize impingement convention all around the leading edge cavity, the baffle 86 shown in FIG. 3 is used as a "space-eater" for the pressure side and suction side internal cooling. As such the baffle 86 creates the low aspect ratio channel 90 between the baffle 86 and the airfoil wall 68. Such low aspect ratio channel 90 can be combined with heat augmentation features 94 (described in further detail below), which are cast onto the inside of the airfoil wall 68. Such features may include but not limited to trip-strips, dimples, pin-fins, divots, etc. Such low aspect ratio channel 90 flow generates very high convective cooling beyond that otherwise achieved with impingent baffle cooling. The cooling air through the low aspect channel 90 is then bled off on the aft-region of airfoil using cooling holes 92 and/or the cooling passage networks 74. After entering the cooling passage networks 74 and cooling holes 92, the cooling air is then discharged through the outlet orifices 84 to provide film cooling on the exterior surface of the second side 68d of the airfoil wall 68. In this example, the outlet orifices 84 and 92 are located aft of the rib 72 and thus provide film cooling to exterior surfaces of the sides 68c/68d.

The size of the low aspect ratio channel 90 and the heat transfer augmentation features may vary depending on the desired pressure loss and heat transfer requirements. For instance, trip strips may have increasing density from the leading edge towards the rib 72 in order to balance the pressure loss and convective needs through the low aspect channel 90.

The inlet orifice or orifices 80 of one or more of the cooling passage networks 74 open to the forward core cavity 70a at a location aft of the showerhead array of impingement orifices 86c. The cooling air thus flows around the outside of the baffle 86 in the channel 90, along the interior surfaces of the first and second sides 68c/68d in the cavity 70a, before entering into the network or networks 74. The inlet orifice or orifices 80 are located in the aft portion of the forward core cavity 70a but may be offset a distance forward from the rib 72. In general, the inlet orifice or orifices 80 are in the aft 50% of the cavity 70a, but more typically will be in the aft 20% or aft 10% of the cavity 70a, which may also be in the forward 50% of the airfoil section 66 between the leading and trailing ends 68a/68b.

The airfoil 60 may include additional features to further enhance cooling effectiveness. For instance, as shown in FIGS. 2B and 3, the first side 68c of the airfoil wall 68 includes trip strips 94 in the forward core cavity 70a. The trips strips 94 are elongated protrusions or ridges that are obliquely angled to the direction of flow in order to cause turbulence in the flow and enhance cooling of the first side 68c. The trip strips 94 project into the channel 90, but do not extend across the channel 90 to touch the baffle 86. For example, the channel 90 diverges aft of the impingement orifices 86c along the first side 68c in the core cavity 70a. The divergence may facilitate flow dynamics over the trip strips 94 for enhanced mixing and cooling. Alternatively, if such an enhancement is not needed, the channel 90 may be constant or substantially constant along the first side 68c.

Figure 4:
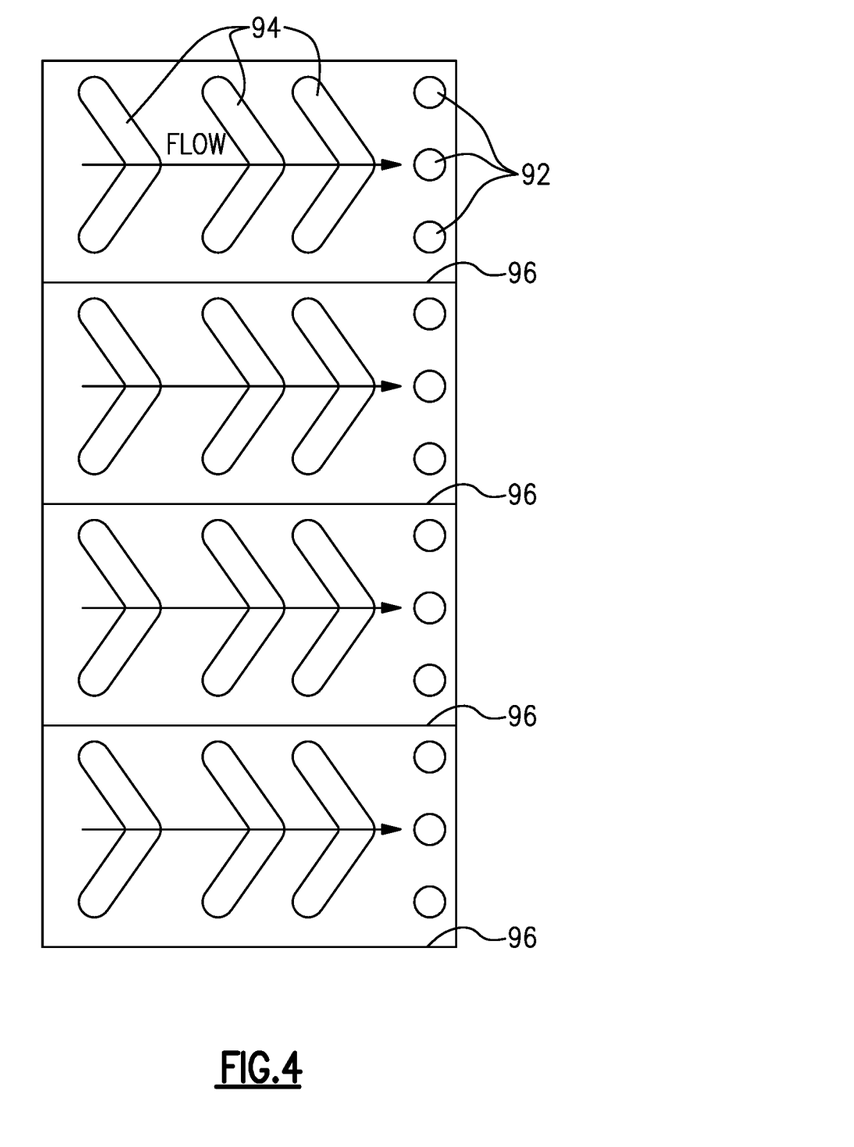
FIG. 4 illustrates a plan view of an interior of a first side of an airfoil wall.

As further shown in FIG. 4, the trip strips 94 have a chevron-shape, and multiple chevron shapes may be arranged as a nested array. While enhanced cooling may be desired at the first side 68c, there may be less need for enhanced cooling at the second side 68d. In that regard, the second side 68d (in the forward core cavity 70a) may exclude any trip strips.

The first side 68c may also include stand-off ridges 96 in the forward core cavity 70a. The baffle 86 abuts the stand-off ridges 96 (see also FIG. 2B), which facilitate proper positioning of the baffle 86 in the forward core cavity 70a. The stand-off ridges 96 are elongated in a chord-wise direction and are longitudinally spaced apart. The stand-off ridges 96 partition the channel 90 into segments. Cooling air from the impingement orifices 86c that flows in the channel 90 is thus prevented from flowing substantially in the longitudinal direction. The stand-off ridges 96 thus facilitate guiding the cooling air to flow in the chord-wise direction, toward the cooling holes 92.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity;
a rib extending from the first side to the second side and partitioning the internal core cavity into a forward cavity and an aft cavity;
a baffle disposed in the forward cavity, the baffle having a showerhead array of impingement orifices adjacent the leading end of the airfoil wall; and
a cooling passage network embedded in the airfoil wall between inner and outer portions of the airfoil wall, the cooling passage network having an inlet orifice through the inner portion of the airfoil wall, an array of pedestals, and at least one outlet orifice through the outer portion, the inlet orifice opening to the forward cavity at a location aft of the showerhead array of impingement orifices.

2. The airfoil as recited in claim 1, wherein the outlet orifice is aft of the rib.

3. The airfoil as recited in claim 1, wherein the first side is a suction side and the second side is a pressure side, and the cooling passage network is in the second side.

4. The airfoil as recited in claim 3, wherein the airfoil wall includes a cooling hole through the first side and opening to the forward cavity aft of the showerhead array of impingement orifices.

5. The airfoil as recited in claim 1, wherein the first side includes trip strips in the forward cavity.

6. The airfoil as recited in claim 5, wherein the second side excludes any trip strips.

7. The airfoil as recited in claim 1, wherein the first side includes stand-off ridges in the forward cavity and the baffle abuts the stand-off ridges.

8. The airfoil as recited in claim 7, wherein the stand-off ridges are elongated in a chord-wise direction of the airfoil section and are spaced apart in the longitudinal direction of the airfoil section.

9. The airfoil as recited in claim 1, wherein the baffle is in a fixed position in the forward cavity with a channel between the baffle and the airfoil wall, wherein the channel diverges along the first side in the forward cavity.

10. The airfoil as recited in claim 1, wherein an aft 60% of the baffle excludes any impingement orifices.

11. The airfoil as recited in claim 1, wherein the first side is a suction side and the second side is a pressure side, the cooling passage network is in the second side, the airfoil wall includes a cooling hole through the first side and opening to the forward cavity aft of the showerhead array of impingement orifices, and the first side includes trip strips in the forward cavity.

12. The airfoil as recited in claim 11, wherein the second side excludes any trip strips, the first side includes stand-off ridges in the forward cavity, and the baffle abuts the stand-off ridges.

13. The airfoil as recited in claim 12, wherein the stand-off ridges are elongated in a chord-wise direction of the airfoil section and are spaced apart in the longitudinal direction of the airfoil section, and an aft 60% of the baffle excludes any impingement orifices.

14. A gas turbine engine comprising:
a compressor section;
a combustor in fluid communication with the compressor section; and
a turbine section in fluid communication with the combustor,
the turbine section having a turbine airfoil that includes
an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity,
a rib extending from the first side to the second side and partitioning the internal core cavity into a forward cavity and an aft cavity,
a baffle disposed in the forward cavity, the baffle having a showerhead array of impingement orifices adjacent the leading end of the airfoil wall, and
a cooling passage network embedded in the airfoil wall between inner and outer portions of the airfoil wall, the cooling passage network having an inlet orifice through the inner portion of the airfoil wall, an array of pedestals, and at least one outlet orifice through the outer portion, the inlet orifice opening to the forward cavity at a location aft of the showerhead array of impingement orifices.

15. The gas turbine engine as recited in claim 14, wherein the outlet orifice is aft of the rib.

16. The gas turbine engine as recited in claim 14, wherein the first side is a suction side and the second side is a pressure side, and the cooling passage network is in the second side.

17. The gas turbine engine as recited in claim 16, wherein the airfoil wall includes a cooling hole through the first side and opening to the forward cavity aft of the showerhead array of impingement orifices.

18. The gas turbine engine as recited in claim 14, wherein the first side is a suction side and the second side is a pressure side, the cooling passage network is in the second side, the airfoil wall includes a cooling hole through the first side and opening to the forward cavity aft of the showerhead array of impingement orifices, and the first side includes trip strips in the forward cavity.

19. The gas turbine engine as recited in claim 18, wherein the second side excludes any trip strips, the first side includes stand-off ridges in the forward cavity, and the baffle abuts the stand-off ridges.

20. The gas turbine engine as recited in claim 19, wherein the stand-off ridges are elongated in a chord-wise direction of the airfoil section and are spaced apart in the longitudinal direction of the airfoil section, and an aft 60% of the baffle excludes any impingement orifices.

* * * * *